United States Patent
Garrison

(10) Patent No.: US 7,767,082 B2
(45) Date of Patent: *Aug. 3, 2010

(54) MOLECULAR ARRANGEMENT MAGNETIC TREATMENT APPARATUS AND METHOD

(75) Inventor: Roy Lee Garrison, Cantonment, FL (US)

(73) Assignee: Gemini Environmental Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/459,406

(22) Filed: Jul. 1, 2009

(65) Prior Publication Data

US 2009/0294371 A1    Dec. 3, 2009

Related U.S. Application Data

(62) Division of application No. 11/443,726, filed on May 31, 2006.

(51) Int. Cl.
    *B01D 35/06* (2006.01)
(52) U.S. Cl. .................. 210/222; 210/695; 209/214
(58) Field of Classification Search .............. 210/222, 210/223, 695, 167.03, 748; 204/554, 557, 204/660, 664; 209/636, 212–217, 226
    See application file for complete search history.

(56) References Cited

U.S. PATENT DOCUMENTS

| | | | | |
|---|---|---|---|---|
| 3,206,657 A * | 9/1965 | Moriya | .................... | 335/303 |
| 3,311,255 A * | 3/1967 | Loveless | .................... | 220/324 |
| 3,371,790 A * | 3/1968 | Luchetta et al. | ............ | 210/223 |
| 3,376,529 A * | 4/1968 | Miyata | .................... | 335/305 |
| 3,489,669 A * | 1/1970 | Ruhnke | .................... | 204/665 |
| 4,422,934 A * | 12/1983 | Debney et al. | ............. | 210/222 |
| 4,602,652 A * | 7/1986 | Ayers | .................... | 137/15.08 |
| 5,534,156 A * | 7/1996 | Sanderson | ................. | 210/695 |
| 5,589,065 A * | 12/1996 | Bogatin et al. | ............. | 210/222 |
| 2007/0108116 A1* | 5/2007 | Meeks | .................... | 210/222 |

* cited by examiner

*Primary Examiner*—Tony G Soohoo
*Assistant Examiner*—David C Mellon
(74) *Attorney, Agent, or Firm*—David O. Simmons

(57) ABSTRACT

A molecular arrangement magnetic treatment apparatus and method includes an apparatus including a material passageway configured for having material flow therethrough and at least one pair of magnets oriented such that material in the material passageway passes through a magnetic field effect produced by the at least one pair of magnets. Further, each magnet of the at least one pair of magnets is allowed to move independent of each other such that the magnetic field effect at least partially influences relative placement of each magnet of the at least one pair of magnets.

15 Claims, 4 Drawing Sheets

MOLECULAR ARRANGEMENT MAGNETIC TREATMENT APPARATUS AND METHOD

CROSS REFERENCE TO RELATED APPLICATION

This application is a Divisional patent application of pending U.S. patent application Ser. No. 11/443,726 filed May 31, 2006 entitled "Molecular Arrangement Magnetic Treatment Apparatus and Method". The Applicant hereby claims the benefit of this non-provisional application under 35 U.S.C. §120, which is hereby incorporated in its entirety herein by this reference.

FIELD OF THE INVENTION

This invention relates to a molecular arrangement magnetic treatment apparatus and method. In particular in accordance with one embodiment, the invention relates to an apparatus including a material passageway configured for having material flow therethrough and at least one pair of magnets oriented such that material in the material passageway passes through a magnetic field effect produced by the at least one pair of magnets. Further, each magnet of the at least one pair of magnets is allowed to move independent of each other such that the magnetic field effect at least partially influences relative placement of each magnet of the at least one pair of magnets. In another embodiment, a molecular arrangement magnetic treatment apparatus including a material container with an inlet and an outlet where the material to be treated is introduced at the inlet and is released at the outlet and where the material container is sized so as to provide an enclosed space into which the material expands and loses velocity. A material passageway is connected at one end to the inlet and at another end to the outlet such that the material must pass through the material passageway. And at least one pair of magnets is provided that are oriented such that material in the passageway must pass between a north pole and a south pole of the pair of magnets.

BACKGROUND OF THE INVENTION

The disposal of waste is a vexing problem involving the tension between disposing of one type of waste and creating an even more toxic waste in its place. By way of example only and not by limitation, the prior art techniques for disposing of household and industrial wastes include a wide variety of prior art "solutions" ranging from simply burying the waste to attempts to change the waste from one form to another as by incineration. Burying the waste may get it out of sight and out of mind for a time but it does not actually dispose of the waste and results most often in long term health hazards caused by the leaching of waste residue and by products into underground water systems, for one example only.

Incineration of waste material has long been a preferred waste material treatment since it greatly reduces the mass of waste material to be handled thereafter. Unfortunately, the end product of the prior art incineration systems is often the most toxic materials known to man, including, for example only, dioxin. This is a particularly vexing problem for incineration systems where the waste is diverse in makeup and ranges from apple cores to mattresses to baby diapers.

Thus, there is a need in the art for an apparatus and method for treating waste materials such that the disposal of waste reduces the waste itself as well as prevents the creation of even more toxic waste as an end product. It, therefore, is an object of this invention to provide an apparatus and method for employing a non reactive molecular arrangement in treating material that is easy to use and inexpensive in comparison to the benefit derived from its use and that effectively reduces the treated material from a potentially toxic nightmare to a harmless and easily controlled residue.

SUMMARY OF THE INVENTION

Accordingly, the molecular arrangement magnetic treatment apparatus and method of the present invention includes a material container with an inlet and an outlet where material to be treated is introduced at the inlet and is released at the outlet and where the material container is sized so as to provide an enclosed space into which the material expands and loses velocity. A material passageway is connected at one end to the inlet and at another end to the outlet such that the material must pass through the material passageway. And at least one pair of magnets oriented such that material in the passageway must pass between a north pole and a south pole of the at least one pair of magnets.

According to another aspect of the invention, the at least one pair of magnets is self aligning such that the north pole and the south pole are free to move so that the north pole and the south pole are always facing each other. In another aspect, the at least one pair of magnets are rod shaped. According to one aspect, the material container includes a moveable lid. In another aspect, the moveable lid includes a safety release cover and, in another, a dual action lift connected on one end to the material container and on another end to the moveable lid.

According to another aspect of the invention, the material container includes a moveable access door. In another aspect, a precipitator is connected to the material container. In another aspect, the material to be treated is selected from a group comprising: gas and liquid.

According to another embodiment of the invention, a molecular arrangement magnetic treatment apparatus includes a material container with a moveable lid and with an inlet and an outlet where material to be treated is introduced at the inlet and is released at the outlet and where the material container is sized so as to provide an enclosed space into which the material expands and loses velocity. A material passageway is connected at one end to the inlet and at another end to the outlet such that the material must pass through the material passageway. And, a number of pairs of magnets are provided and oriented such that material in the passageway must pass between a north pole and a south pole of the pairs of magnets such that the material is given a negative electrical charge and where at least one pair of the number of pairs of magnets is self aligning such that the north pole and the south pole are free to move so that the north pole and the south pole are always facing each other.

According to another aspect of this invention, all of the pairs of magnets are self aligning. In another aspect, the moveable lid includes a safety release cover. In another aspect, a dual action hydraulic arm is connected on one end to the material container and on another end to the moveable lid. In another aspect, the material container includes a moveable access door. According to a further aspect, a precipitator is connected to the material container. In another aspect, the material is selected from a group comprising: gas, steam and liquid.

In accordance with another embodiment of the invention, a molecular arrangement magnetic treatment method for treating material includes the steps of providing a material container with a moveable lid and with an inlet and an outlet where material to be treated is introduced at the inlet and is released at the outlet and where the material container is sized so as to provide an enclosed space into which the material expands and loses velocity; connecting a material passageway at one end to the inlet and at another end to the outlet such that the material must pass through the material passageway; orienting a number of pairs of magnets such that material in the passageway must pass between a north pole and a south pole of the pairs of magnets such that the material is given a negative electrical charge and where at least one pair of the pairs of magnets is self aligning such that the north pole and the south pole are free to move so that the north pole and the south pole are always facing each other; and introducing material to be treated into the inlet.

According to another aspect of this invention, the method includes the steps of connecting a precipitator to the material container and precipitating negatively charged material from the material after the material has been negatively charged. In another aspect, the method includes the step of providing a moveable access panel to the material container. In another aspect, the material to be treated is selected from a group comprising: gas, steam and liquid.

According to another embodiment of the invention, an apparatus includes a material passageway configured for having material flow therethrough and at least one pair of magnets oriented such that material in the material passageway passes through a magnetic field effect produced by the at least one pair of magnets, wherein each magnet of the at least one pair of magnets is allowed to move independent of each other such that the magnetic field effect at least partially influences relative placement of each magnet of the at least one pair magnets.

In another aspect of this invention, the at least one pair of magnets is oriented such that the material passes between a north pole and a south pole of each magnet of the at least one pair of magnets. In another aspect of this invention, the at least one pair of magnets are oriented such that a north pole of a first magnet of the at least one pair of magnets is adjacent a south pole of a second magnet of the at least one pair of magnets and a south pole of the first magnet is adjacent a north pole of the second magnet.

In another aspect, the at least one pair of magnets is oriented such that material in the material passageway passes between the at least one pair of magnets. In one aspect, the passageway is configured for causing the material to decelerate therein prior to passing between the at least one pair of magnets. In a further aspect, the at least one pair of magnets is at least partially located within the material passageway. In one aspect, the at least one magnet holder is positioned at least partially within the material passageway and includes a pair of magnet receiving spaces, wherein a first magnet receiving space of the at least one magnet holder has a first magnet of the at least one pair of magnets disposed therein in a manner allowing the first magnet to freely rotate within the first magnet receiving space and a second magnet receiving space of the at least one magnet holder has a second magnet of the at least one pair of magnets disposed therein in a manner allowing the second magnet to freely rotate within the second magnet receiving space. In one aspect, each one of the magnet receiving spaces is elongated and each one of the magnets is rod shaped. In a further aspect, the at least one the magnet holder includes a passageway extending between the magnet receiving spaces such that the material can flow through the at least one magnet holder between the at least one pair of magnets. In yet another aspect, each one of the magnets is disposed within a respective magnet receiving space of a magnet holder in a manner allowing each one of the magnets to freely move within therein.

According to another embodiment of the invention, the apparatus includes a material container with an inlet and an outlet, where material to be treated is introduced at the inlet and is released at the outlet. A material passageway is connected between the inlet and outlet of the material container such that the material must pass through the material passageway. At least one pair of magnets is located within the material container in a manner such that material in the material passageway passes through a magnetic field effect produced by the at least one pair of magnets, where each magnet of the at least one pair of magnets is allowed to move independent of each other such that the magnetic field effect at least partially influences relative placement of each magnet of the at least one pair magnets.

In another aspect of this invention, the at least one pair of magnets is oriented such that: a north pole of a first magnet of the at least one pair of magnets is adjacent a south pole of a second magnet of the at least one pair of magnets and a south pole of the first magnet is adjacent a north pole of the second magnet. In one aspect, the at least one pair of magnets is oriented such that material in the material passageway passes between the at least one pair of magnets. In another aspect at least one of the container and the material passageway is configured for causing the material to decelerate therein prior to passing between the at least one pair of magnets. In another aspect, the at least one pair of magnets is at least partially located within the material passageway. In a further aspect, the at least one magnet holder is at least partially within the material passageway and includes a pair of magnet receiving spaces, where a first magnet receiving space of the at least one magnet holder has a first magnet of the at least one pair of magnets disposed therein in a manner allowing the first magnet to freely rotate within the first magnet receiving space. A second magnet receiving space of the at least one magnet holder has a second magnet of the at least one pair of magnets disposed therein in a manner allowing the second magnet to freely rotate within the second magnet receiving space. In another aspect of this invention, each one of the magnet receiving spaces is elongated and each one of the magnets is rod shaped. In a further aspect, the at least one the magnet holder includes a passageway extending between the magnet receiving spaces such that the material can flow through the at least one magnet holder between the at least one pair of magnets. In another aspect, each one of the magnets is disposed within a respective magnet receiving space of a magnet holder in a manner allowing each one of the magnets to freely move within therein.

According to another embodiment of the invention, a method is provided that includes causing material to flow through a material passageway; positioning at least one pair of magnets to produce a magnetic field effect within the material passageway such that the material passes through the magnetic field effect as the material passes through the material passageway; and allowing each magnet of the at least one pair of magnets to move independent of each other such that the magnetic field effect at least partially influences relative placement of the magnets of the at least one pair of magnets.

In another aspect of this invention, the at least one pair of magnets is oriented such that material in the material passageway passes between the at least one pair of magnets and the step of causing material to flow through a material passageway includes causing the material to decelerate therein prior to passing between the at least one pair of magnets. In another aspect, each magnet of the at least one pair of magnets includes a north pole and a south pole and allowing the material to flow through the material passageway includes allowing the material to flow between the north pole and the south pole of each magnet of the at least one pair of magnets.

In a further aspect, the method includes at least one magnet holder at least partially within the material passageway and including a pair of magnet receiving spaces, where a first magnet receiving space of the at least one magnet holder has a first magnet of the at least one pair of magnets disposed therein in a manner allowing the first magnet to freely rotate within the first magnet receiving space and a second magnet receiving space of the at least one magnet holder has a second magnet of the at least one pair of magnets disposed therein in a manner allowing the second magnet to freely rotate within the second magnet receiving space. In another aspect, each one of the magnet receiving spaces is elongated and each one of the magnets is rod shaped. In one aspect, the at least one the magnet holder includes a passageway extending between the magnet receiving spaces such that the material can flow through the at least one. magnet holder between the at least one pair of magnets. In another aspect, each one of the magnets is disposed within a respective magnet receiving space of a magnet holder in a manner allowing each one of the magnets to freely move within therein.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
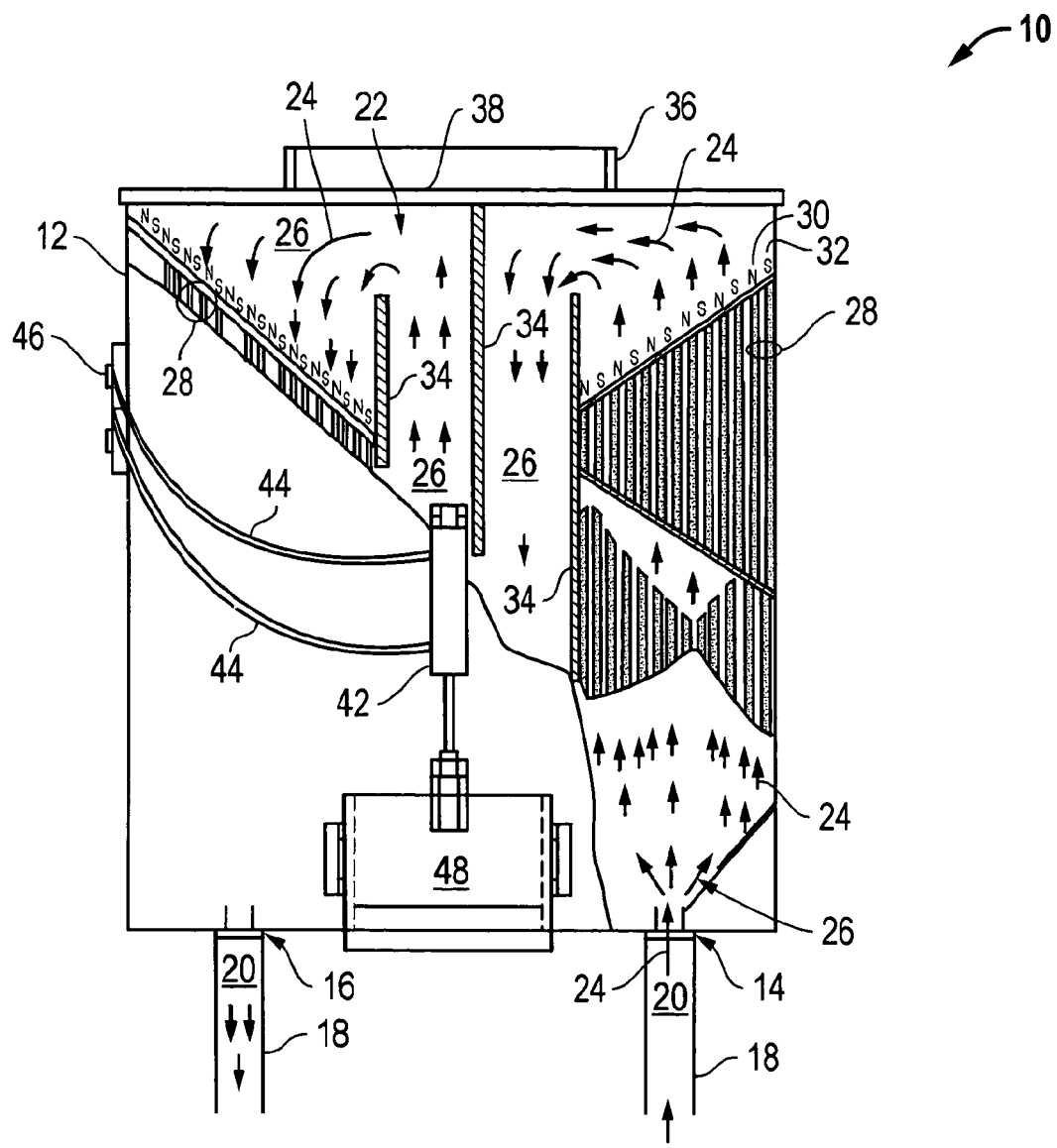
FIG. 1 is a side partial cut away view of the magnetic treatment apparatus according to one embodiment of the invention.

The preferred embodiment of the present invention is illustrated by way of example in FIGS. 1-5. With specific reference to FIGS. 1 and 2, the molecular arrangement magnetic treatment apparatus and method 10 according to one embodiment of the invention includes material container 12 with an inlet 14 and an outlet 16. Inlet 14 and outlet 16 are attached to conduit 18 for directing material 20 into inlet 14 and away from outlet 16. Importantly, relative to each other, container 12 is large as compared to the size of inlet 14, outlet 16 and conduit 20 such that the interior 22 of material container 12 is a large enclosed space 22 into which material 20 is directed. The result is that material 20 introduced to material container 12 at inlet 14 loses velocity and slows down.

Arrows 22 in FIG. 1 show the direction of the flow of material 20 in the interior 22 of material container 12. From inlet 14, material 20 is directed into material passageway 26. Material passageway 26 is constructed so as to maximize its overall length within the interior 22 of material container 12. As a result, material passageway 26 runs up and down the interior 22 of material container 12 as illustrated. Certainly any design now known or hereafter developed for effectively increasing the length of material passageway 26 is satisfactory for the purposes of the invention.

Importantly, material passageway 26 includes at least one pair of magnets 28 such that each pair of magnets 28 is positioned such that the north pole 30 of one magnet 28 faces the south pole 32 of each magnet pair 28. The magnets 28 may be included in all or some of the material passageway 26 as shown in FIG. 1. According to one embodiment, many multiple pairs of magnets 28 are positioned side by side in material passageway 26 and effectively fill up the entire material passageway 26. Whether or not multiple pairs of magnets 28 are used, in every case Applicant's molecular arrangement magnetic treatment apparatus and method 10 requires that all material 20 introduced at inlet 14 must pass between the north pole 30 and the south pole 32 of at least one magnet pair 28 prior to reaching outlet 16.

Material passageway 26 may be created from barrier walls 34 and pairs of magnets 28 may be connected within material passageway 26 to barrier walls 34, by way of example only and not by limitation, as illustrated.

Figure 2:
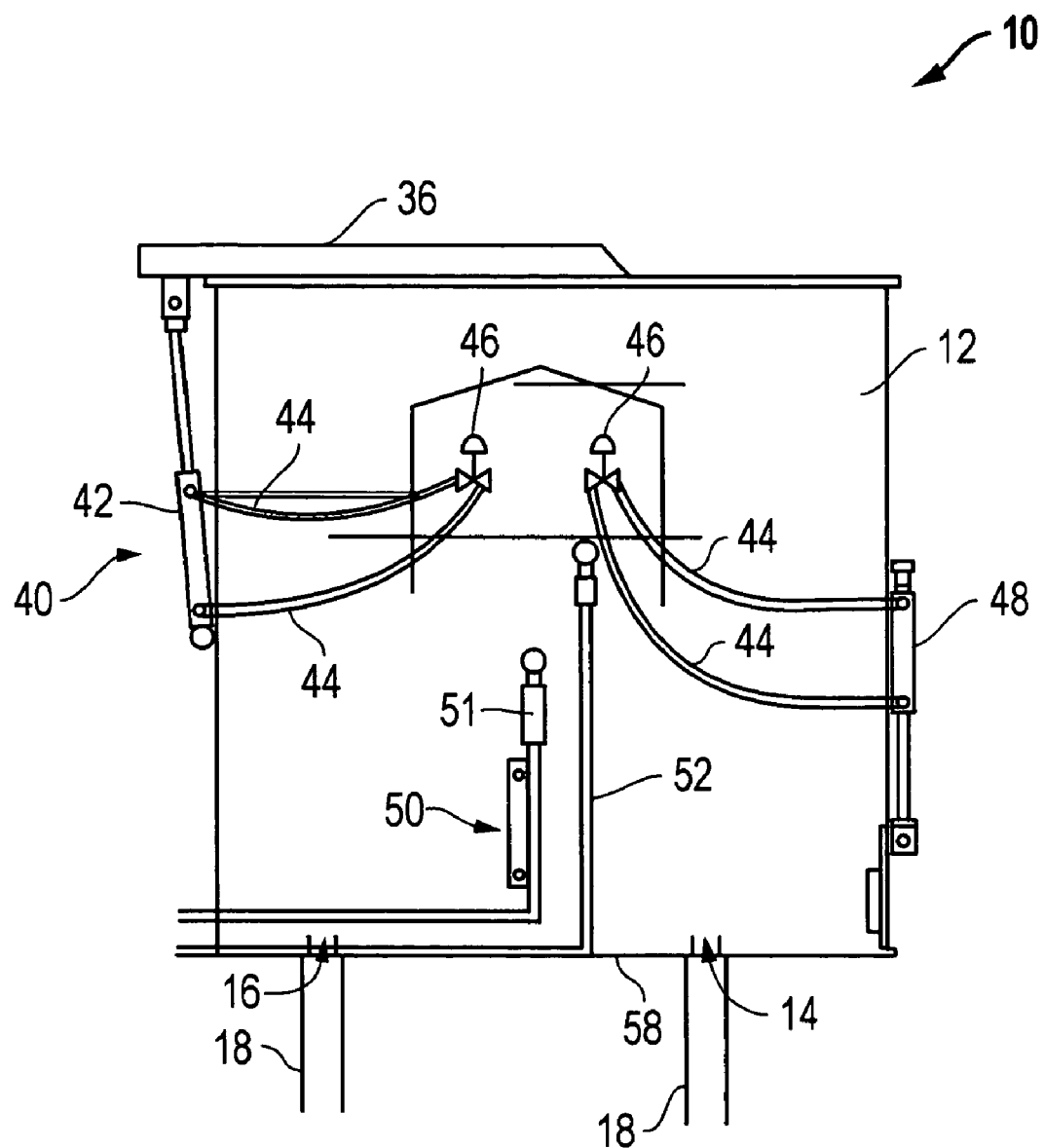
FIG. 2 is a side view of the invention of FIG. 1.

FIGS. 1 and 2 also illustrate other features of the invention including moveable lid 36 and safety release cover 38. Moveable lid 36 is conformed to allow the release of material 20 from within material container 12 at another location besides outlet 16. Moveable lid 36 is preferably very heavy and resists movement under normal operating conditions. In the event of a sudden increase of pressure within material container 12, however, moveable lid 36 is provided to prevent damage or destruction of magnetic treatment apparatus 10. Likewise, safety release cover 38 is an explosive release cover, as known in the art, for providing an escape route for material 20 from the interior 22 of material container 12 should an explosion occur. Applicant has determined that the likelihood of an over pressure event is small but that it is reasonable to provide for it rather than risk damage to the apparatus 10.

An additional feature of the moveable lid 36 includes a dual action lift 40 as shown in FIG. 2. Dual action lift 40, according to one embodiment, is a hydraulic arm 42 connected on one end to material container 12 and on the other end to moveable lid 36. Hydraulic lines 44 are connected to controller 46 so that a user can intentionally raise and lower moveable lid 36 for maintenance, inspections or for any other purpose. Additionally, hydraulic arm 42 acts as a shock absorber should a rapid expansion event occur. The construction and operation of hydraulic arm 42 and hydraulic lines 44 are well within the ability of those of ordinary skill in the art and are not discussed more fully hereafter.

Moveable access door 48, as shown in FIG. 1, is also connected to a hydraulic arm 42 and by hydraulic lines 44 to a controller 46. Access door 48 enables a user to gain access to the interior 22 of material container 12 at a location other than at moveable lid 36.

FIG. 2 also shows another feature of the invention in which fire fighting devices 52 are provided in the form of CO2 lines 52 and water lines 54. Again, in an abundance of caution Applicant's magnetic treatment apparatus 10 includes fire fighting devices 52 to hedge the risk of damage and destruction should an explosive event occur.

As used herein the term "material" includes any gas, liquid or solid material. It is anticipated by the Applicant that a series of magnetic treatment apparatus 10 will be used at different locations in an incineration process so as to capture gas, such as steam or smoke for example only, and liquids, such as results from condensed steam, for example, and solids resulting from incineration wherever occurring in an incineration process.

Figure 3:
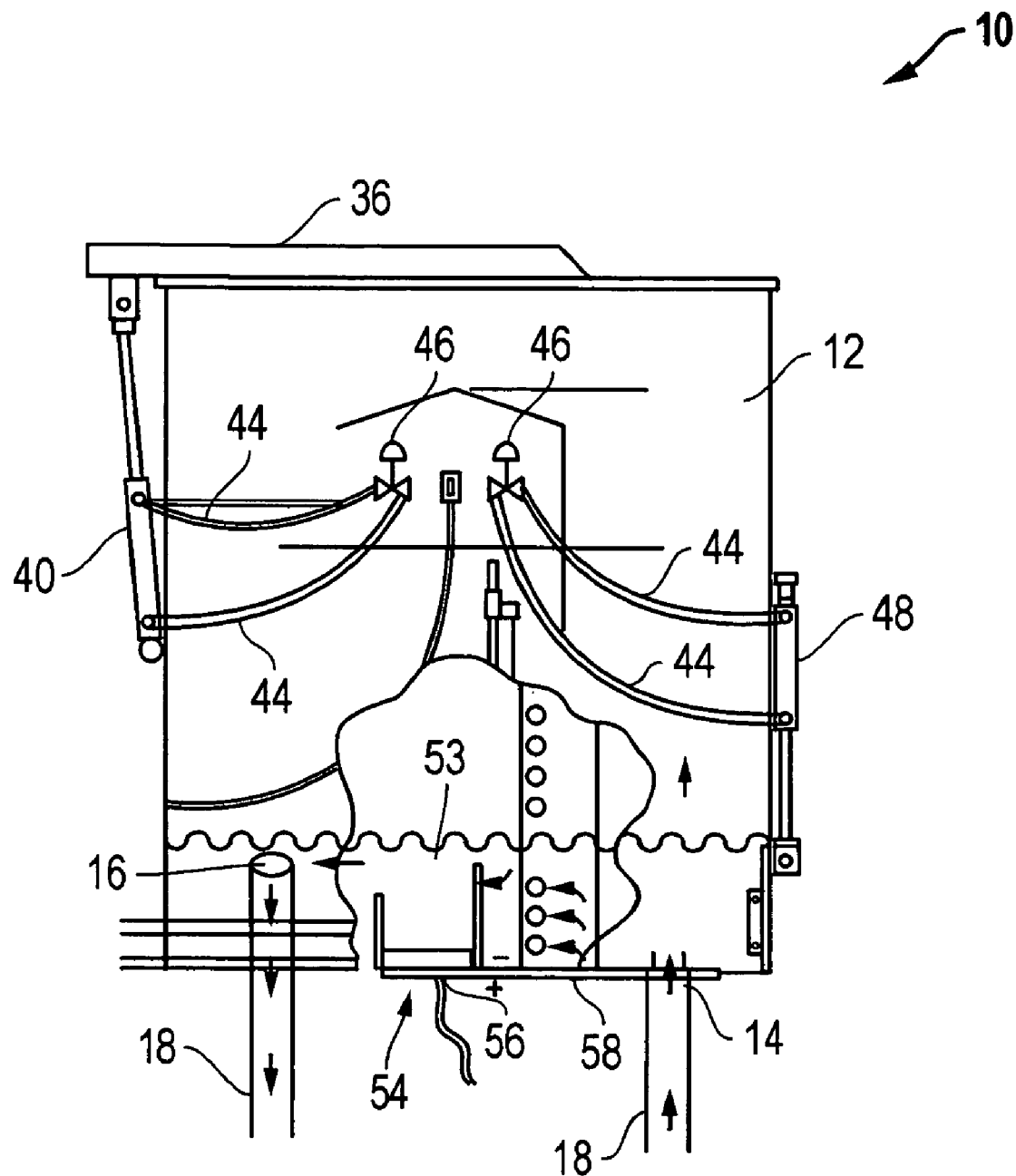
FIG. 3 is a side partial cut away view of another embodiment of the magnetic treatment apparatus.

Referring now to FIG. 3 another embodiment of the invention is disclosed in which a material 20 in the form of steam, for example only, is introduced at inlet 14 to material container 12. Material container 12 is partially filled with water 52 through which the steam must pass. A precipitator 54 is connected in the preferred form of a cathode 56 at the bottom 58 of material container 12. Importantly, all material 20, having passed between north poles 30 and south poles 32, is negatively charged by Applicant's molecular arrangement magnetic treatment apparatus 10. As a result, the use of precipitator 54 in the form of a cathode 56 causes all negatively charged material 20 to be collected in the bottom 58. Thereafter, periodically, the precipitated material 20 at the bottom 58 of the material container 12 may be removed through access door 48 as needed or desired. The advantageous result is that the water 52 is purified and may be safely used and reused as desired. Precipitated material 20 is likely to be a collection of heavy metals produced by metabolic waste processing units. Whatever precipitated material 20 is, once collected by precipitation it is capable of being recycled and reused.

Figure 4A:
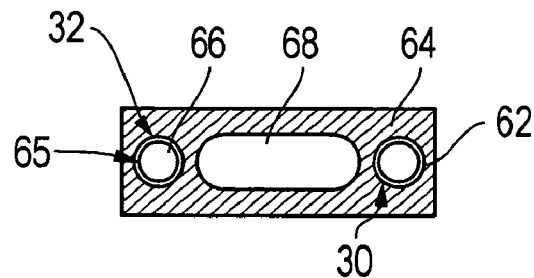
FIGS. 4A and 4B are enlarged views from the top and side of the self aligning magnets and passageway of the invention.
Figure 4B:
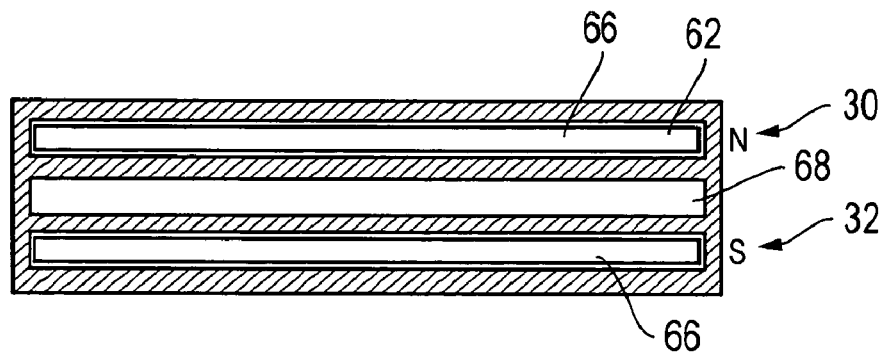

FIG. 4A is an enlarged top view and FIG. 4B is an enlarged side view of the pair of magnets 28 according to a preferred embodiment of the invention. Referring to FIG. 4A, rod shaped magnet 62 is moveably located in magnet holder 64. Magnet holder 64 includes a pair of spaces 65 conformed to moveably receive magnet 62 and rod shaped magnet 66. In a pair of rod shaped magnets 62 and 66, one is charged as a north pole 30 and the other is charged as the south pole 32. In between rod shaped magnets 62 and 66, magnet holder 64 includes magnet holder passageway 68. When, as anticipated in most situations, more than one pair of magnets 28 is used, each magnet holder 64 is located next to another magnet holder 64 such that material passageway 26 is completely filed with magnet holders 64 such that material 20 is forced to pass down at least one magnet holder passageway 68 and between the north pole 30 and the south pole 32 of at least one magnet pair 28.

Importantly, Applicant has determined that for optimum operation, the magnet pairs 28 of molecular arrangement magnetic treatment apparatus 10 must be self aligning. As the magnetic field changes from geographic location to geographic location and because magnetic fields often fluctuate within an active environment, such as for example only and not by limitation an incineration process with extreme temperatures and pressures, it is important that the magnet pairs 28 always be aligned north to south. Rod shaped magnets 62 and 66 freely rotate within rod shaped spaces 65 in magnet holder 64. In order to ensure the self aligning feature, a lubricant of any known type may be added such as graphite. Rod shaped magnets 62 and 66 may be sealed within magnet holder 64 with or without lubricant in order to prevent any material 20 or anything else from interfering with the smooth free movement of the magnets 62 and 66 within magnet holder 64.

Figure 5A:
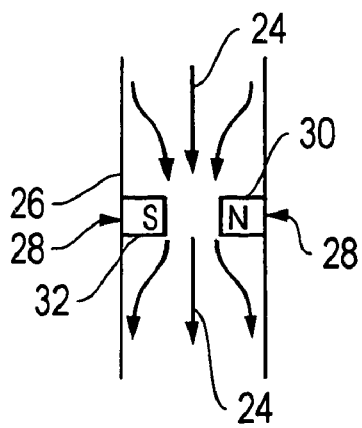
FIGS. 5A and 5B are schematic diagrams of material passing the north and south poles of a pair of magnets.
Figure 5B:
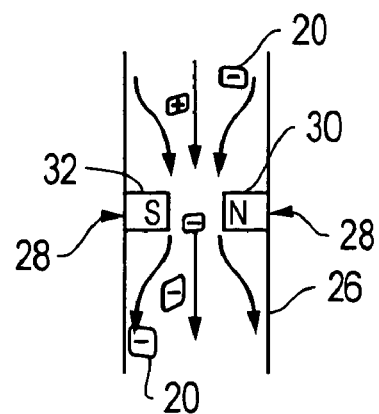

Referring now to FIGS. 5A and 5B, FIG. 5A shows the flow of material 20 by arrows 24 within material passageway 26. Again, all the material 20 that enters inlet 14 must pass by at least one pair of magnets 28 and in particular between a north pole 30 and a south pole 32. Material 20, as shown in FIG. 5B, may be either positively charged or negatively charged before passing by magnet pair 28. But all material 20 that passes by magnet pair 28 and north pole 30 and south pole 32 will become negatively charged. Importantly, the operation of Applicant's invention ensures, by manipulating the electrical potential of the material 20, that prior art dangerous emissions and chemical reactions simply can not occur. That is, introducing material 20 to the magnetic field aligns the material 20 to the same direction of the magnetic field alignments. That is, the molecules of all the material 20 are "arranged" by Applicant's invention. This creates a magnetic process moment in the material 20 that suspends reactivity or molecular bonding until such higher energies are applied to the material 20 thereby keeping it from collecting or reacting and forming dangerous crystalline structures, compounds, nuclear isotopes and other dangerous and toxic compounds.

Further, the north poles 30 and south poles 32 and resultant magnetic fields are automatically self aligned by the above described self alignment system during flow of material 20 through the invention during which small particles of material 20 and its mass pull on the magnetic fields thereby inducing electron movement to better alignment with the magnetic field pattern. Because magnetic rods 62 and 66 are not attached and can move freely inside the magnet holder 64 in spaces 65, the rods 62 and 66 can make otherwise impossible adjustments utilizing the magnetic strengths of the applied fields and the attraction north to south arrangements.

Applicant has determined that the design formula for calculating the correct flow space, magnet holder passageway 68, between pairs of magnets 28 is relevant to the gauss strength of the magnets 28 and the flow rate density of material 20 introduced to the molecular arrangement magnetic treatment apparatus 10. For example only and not by way of limitation, typical exhaust gas emissions containing particulate matter not exceeding 500 parts per million cubic feet will have a design free flow space, magnet holder passageway 68, of twice the distance of the diameter of a magnetic rod 28 with 2000 gauss.

By way of further explanation, this invention is a chamber device that can be manufactured to fit the flow and volumetric displacements of any emissions point where combustion by products are vented, such as to exhaust stacks for example only. Some critical benefits of the invention are that the magnetic field effect produced by magnets 28 arrange molecular scale particles of material 20 in such a way that they become significantly less reactive thereby enabling Applicant's invention to significantly reduce many types of harmful emissions common in waste disposal systems such as, for example only, the crystalline structures of dangerous dioxins.

All exhaust materials 20 (steam vapor or exhaust gas for example) normally exiting the current tens of thousands of combustion units powering everything from small dry cleaning operations to very large industrial furnace operations are suitable for use of Applicant's invention as disclosed herein. When utilized, the invention will reduce or completely eliminate the risk of dangerous dioxin emissions thereby assisting great new developments in assessing environmental impacts of constructing waste disposal technology as well as enabling the resurrection of industrial waste to energy projects that have been challenged as being environmentally unsafe. In short, Applicant's invention represents a powerful pollution reduction device for use by state and other environmental regulators worldwide. The need for the technology embodied by Applicant's has been sought by the EPA and the Department of Energy for decades and will help facilitate acceptable environmental solutions worldwide.

The best and most simple way to understand how the invention works and its concepts of how it affects particles or emission materials 20 is to key on one of the latest buzz words of new science "nana technology". Applicant's invention repositions tiny particles by reacting their electrons electrical state or its electrical position. In magnetism it is understandable that the fields of a same charge repel away from each other. Therefore, in this device the materials are directed through strong magnetic fields that induce a current upon particles 20 of a different electrical potential. The effect on the electron is like flipping over a tiny magnet so that its magnetic poles are aligned all in the same direction. By such molecular arrangement the apparatus 10 is able to prevent many chemical reactions that produce dangerous chemical compounds from ever occurring, as normally very reactive conditions are present during and directly after combustion. However, this invention introduces an environmental protective measure beyond filtration or scrubbing technologies. The Applicant realizes this is a multi-billion dollar solution to changing the waste industry and its various industrializations in converting waste to energy.

The description of the present embodiments of the invention has been presented for purposes of illustration, but is not intended to be exhaustive or to limit the invention to the form disclosed. Many modifications and variations will be apparent to those of ordinary skill in the art. For example, the apparatus may be used in series or separately. It can accommodate essentially any flowing material and is not limited to treating any particular type of material or waste. As such, while the present invention has been disclosed in connection with an embodiment thereof, it should be understood that other embodiments may fall within the spirit and scope of the invention as defined by the following claims.

What is claimed is:

1. An apparatus, comprising:
   a material passageway configured for having a material flow therethrough; and
   at least one magnet holder disposed within the material passageway, wherein said at least one magnet holder includes a pair of spaced-apart magnet receiving spaces and a magnet holder passageway positioned between said pair of magnet receiving spaces and wherein said at least one magnet holder is disposed within the material passageway in a manner whereby all of said material is forced to flow through the magnet holder passageway of said at least one magnet holder at at least one region along the material passageway; and
   at least one pair of magnets, wherein a first one of said magnets is disposed within a first one of said magnet receiving spaces in a manner allowing the first one of said magnets to move therein and a second one of said magnets is disposed within a second one of said magnet receiving spaces in a manner allowing the second one of said magnets to move therein such that material in the material passageway passes through a magnetic field effect produced by said at least one pair of magnets as said material flows through the magnet holder passageway of said at least one magnet holder and wherein each magnet of said at least one pair of magnets is allowed to move independent of each other such that the magnetic field effect at least partially influences relative placement of each magnet of said at least one pair magnets.

2. The apparatus of claim 1 wherein said at least one pair of magnets is oriented such that said material passes between a north pole and a south pole of each magnet of said at least one pair of magnets.

3. The apparatus of claim 2 wherein said at least one pair of magnets are oriented such that:
   a north pole of a first magnet of said at least one pair of magnets is adjacent a south pole of a second magnet of said at least one pair of magnets; and
   a south pole of the first magnet is adjacent a north pole of the second magnet.

4. The apparatus of claim 1 wherein said at least one pair of magnets is oriented such that material in the material passageway passes between said at least one pair of magnets.

5. The apparatus of claim 4 wherein at least one of the material passageway and the magnet holder passageway is configured for causing said material to decelerate therein prior to passing through the magnetic field effect.

6. The apparatus of claim 1 wherein:
   each one of said magnet receiving spaces is elongated; and
   each one of said magnets is rod shaped.

7. An apparatus, comprising:
   a material container with an inlet and an outlet, wherein a material to be treated is introduced at said inlet and is released at said outlet;
   a material passageway connected between said inlet and said outlet of the material container such that said material must pass through the material passageway;
   at least one magnet holder disposed within the material passageway, wherein said at least one magnet holder includes a pair of non-intersecting magnet receiving spaces and a magnet holder passageway positioned between said pair of non-intersecting magnet receiving spaces and wherein said at least one magnet holder is disposed within the material passageway in a manner whereby all of said material is forced to flow through the magnet holder passageway of said at least one magnet holder at at least one region along the material passageway; and
   at least one pair of magnets, wherein a first one of said magnets is disposed within a first one of said magnet receiving spaces in a manner allowing the first one of said magnets to move therein and a second one of said magnets is disposed within a second one of said magnet receiving spaces in a manner allowing the second one of said magnets to move therein such that material in the material passageway passes through a magnetic field effect produced by said at least one pair of magnets, wherein each magnet of said at least one pair of magnets is allowed to move independent of each other such that the magnetic field effect at least partially influences relative placement of each magnet of said at least one pair magnets.

8. The apparatus of claim 7 wherein said at least one pair of magnets is oriented such that:
   a north pole of a first magnet of said at least one pair of magnets is adjacent a south pole of a second magnet of said at least one pair of magnets; and
   a south pole of the first magnet is adjacent a north pole of the second magnet.

9. The apparatus of claim 8 said at least one pair of magnets is oriented such that material in the material passageway passes between said at least one pair of magnets.

10. The apparatus of claim 9 wherein at least one of the material passageway and the magnet holder passageway is configured for causing said material to decelerate therein prior to passing through the magnetic field effect.

11. The apparatus of claim 7 wherein:
    each one of said magnet receiving spaces is elongated; and
    each one of said magnets is rod shaped.

12. A method, comprising:
    providing at least one magnet holder within a material passageway of an apparatus, wherein said at least one magnet holder includes a pair of non-intersecting magnet receiving spaces and a magnet holder passageway positioned between said pair of non-intersecting magnet receiving spaces, wherein said at least one magnet holder is disposed within the material passageway in a manner whereby a material flowing through the material passageway is forced to flow through the magnet holder passageway of said at least one magnet holder at at least one region along the material passageway;
    providing a first one of said magnets within a first one of said magnet receiving spaces in a manner allowing the first one of said magnets to move therein and a second one of said magnets within a second one of said magnet receiving spaces in a manner allowing the second one of said magnets to move therein, wherein the first one of said magnets and the second one of said magnets jointly produce a magnetic field effect within the magnet holder passageway such that material passes through the magnetic field effect as said material passes through the magnet holder passageway;

allowing each magnet of said at least one pair of magnets to move independent of each other such that the magnetic field effect at least partially influences relative placement of said magnets of said at least one pair of magnets; and causing said material to flow through the material passageway.

13. The method of claim 12 wherein:

causing material to flow through a material passageway includes causing said material to decelerate therein prior to passing through the magnetic field effect.

14. The method of claim 12 wherein:

each magnet of said at least one pair of magnets includes a north pole and a south pole; and allowing said material to flow through the material passageway includes allowing said material to flow between the north pole and the south pole of each magnet of said at least one pair of magnets.

15. The method of claim 12 wherein:

each one of said magnet receiving spaces is elongated; and each one of said magnets is rod shaped.

\* \* \* \* \*